United States Patent
Hehlen et al.

(10) Patent No.: US 6,580,842 B1
(45) Date of Patent: Jun. 17, 2003

(54) INTEGRATED OPTICAL CIRCULATOR ARRAY

(76) Inventors: Markus P. Hehlen, 118A Belwood La., Los Gatos, CA (US) 95032; William K. Bischel, 740 Olive St., Menlo Park, CA (US) 94025

( * ) Notice: Subject to any disclaimer, the term of this patent is extended or adjusted under 35 U.S.C. 154(b) by 0 days.

(21) Appl. No.: 10/073,814

(22) Filed: Feb. 11, 2002

(51) Int. Cl.[7] .............. G02B 6/00; G02B 27/28; G02B 5/30
(52) U.S. Cl. .............. 385/11; 385/24; 385/27; 385/31; 385/73; 359/484; 359/497; 372/703
(58) Field of Search .............. 385/11–14, 15, 385/24, 27, 31, 39, 47, 73; 359/484, 487, 494, 495, 497; 372/703, 6

(56) References Cited

U.S. PATENT DOCUMENTS

| | | |
|---|---|---|
| 5,689,360 A | 11/1997 | Kurata et al. |
| 5,689,593 A | 11/1997 | Pan et al. |
| 5,696,856 A | 12/1997 | Van Der Tol |
| 5,706,371 A | 1/1998 | Pan |
| 5,808,793 A | 9/1998 | Chang et al. |
| 5,825,950 A | 10/1998 | Cheng |
| 6,014,475 A | 1/2000 | Frisken |
| 6,043,933 A | 3/2000 | Chang |
| 6,075,642 A | 6/2000 | Chang |
| 6,167,174 A | 12/2000 | Zhang et al. |
| 6,249,619 B1 * | 6/2001 | Bergmann et al. .......... 385/11 |

OTHER PUBLICATIONS

T. Sato, Et Al., "Lens–Free In–Line Optical Isolators", Optics Letters, Oct. 1, 1999, pp. 1337–1339, Opt. Soc. Amer.

* cited by examiner

*Primary Examiner*—Phan T. H. Palmer

(57) ABSTRACT

A circulator array is constructed in a planar substrate by forming a plurality of waveguide pair structures, each waveguide pair structure having first and second sections respectively coupled by first and second polarization multiplexers. A nonreciprocal polarization rotation element is positioned in the optical paths of the waveguide pair structures and is configured to rotate the polarization of light passing from the second sections of the waveguides to the first sections while leaving unchanged the polarization of light passing from the first sections to the second sections, such that optical signals received at one port of the circulator structure are routed along a predetermined path to another port of the circulator structure.

23 Claims, 9 Drawing Sheets

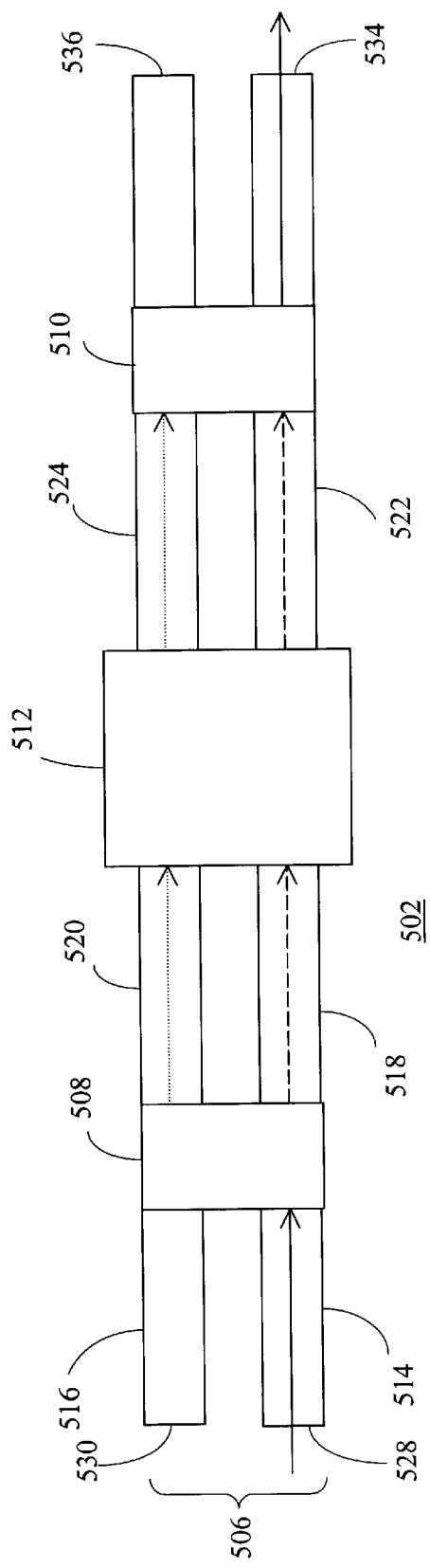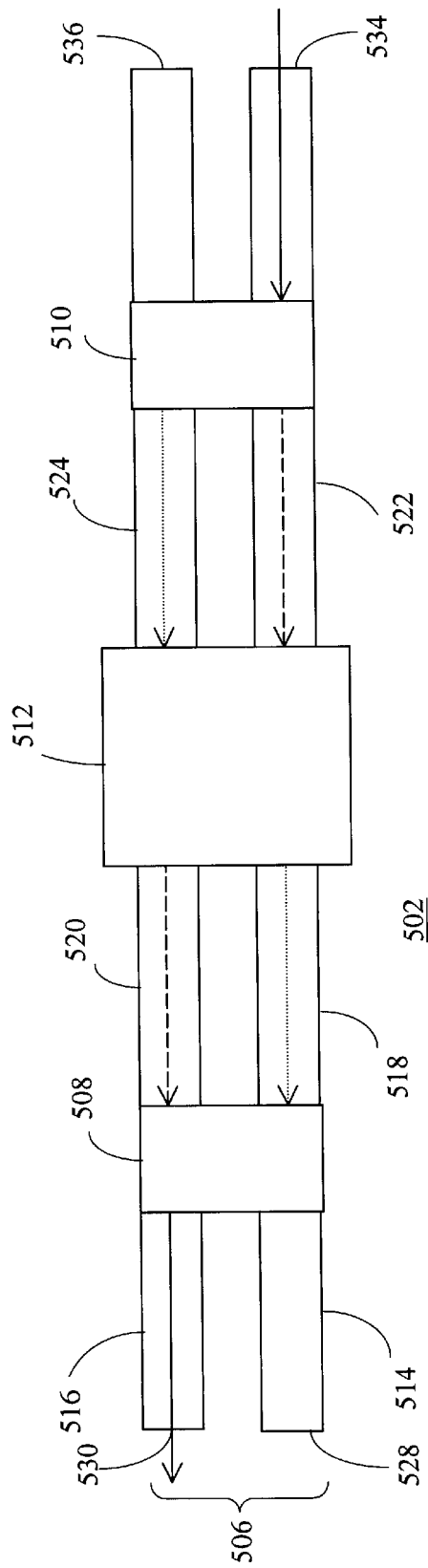
Fig. 7(a)
Fig. 7(b)

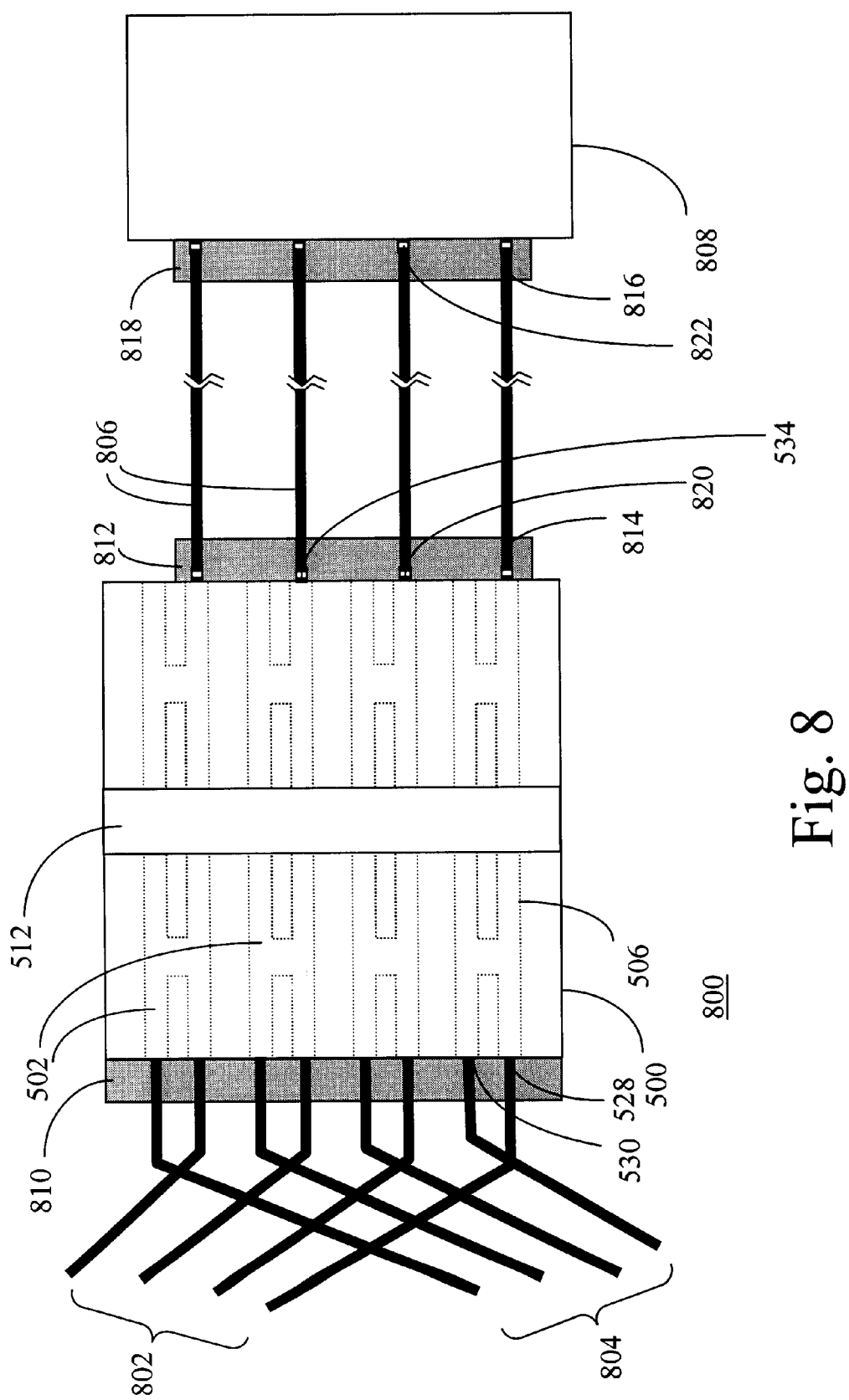

INTEGRATED OPTICAL CIRCULATOR ARRAY

CROSS-REFERENCE TO RELATED APPLICATIONS

This application is related to the following commonly assigned applications filed on even date herewith: U.S. application Ser. No. 10/073,763 entitled "Integrated Optical Isolator Array" by inventors Hehlen et al., and U.S. application Ser. No. 10/073,754 entitled "Doped Fiber Amplifier Utilizing Integrated Circulator Array" by inventors Hehlen et al.

BACKGROUND

1. Field of the Invention

The present invention relates generally to nonreciprocal optical devices, and more particularly to arrays of nonreciprocal devices, such as isolators and circulators, integrated on a common planar optical substrate.

2. Description of the Prior Art

Nonreciprocal optical devices, such as optical isolators and optical circulators, are essential components of optical communication systems. Optical isolators pass light propagating in a forward direction while inhibiting the propagation of light in a backward direction. Optical circulators enable the routing of light from one optical fiber or waveguide to another based upon the direction of light propagation.

Commercially available nonreciprocal optical devices generally take the form of individual (non-integrated) assemblies of bulk optical components. For example, optical isolators typically utilize a GRIN lens attached to an input fiber to collimate the input light. The light is then passed through a series of polarization and Faraday rotation components and subsequently recaptured by a second GRIN lens that recouples the light onto an output fiber. Manufacturing of such isolators involve numerous assembly and manufacturing steps (most of which must be performed manually), resulting in high costs and limitations in production volume. The growth and increasingly price-competitive character of the fiber optic equipment industry has created a demand for low-cost nonrieciprocal devices which may be manufactured in large volumes using automated assembly techniques. A particularly strong demand exists for array architectures, in which plural isolators or other nonreciprocal devices are integrated into a single structure.

U.S. Pat. No. 5,706,371 to Pan ("Optical Isolator Array Device") presents one example of an isolator array architecture. The Pan device consists of corresponding input and output arrays of optical fibers disposed in V-grooves formed on one surface of a supporting substrate. An isolator subassembly, comprising a strip of Faraday material sandwiched between strips of birefringent crystal material, is fixed within a transverse trench formed in the substrate between the input and output optical fiber arrays. Light leaving the input fibers is collimated (either by GRIN lenses located proximal to the fiber endfaces or by at thermally expanded cores) and directed onto the isolator subassembly. The receiving ends of the output fibers are provided with collimating elements (GRIN lenses or thermally expanded cores) to couple light transmitted from the corresponding input fibers through the isolator subassembly.

The approach described in the aforementioned Pan patent does offer certain advantages over existing single-channel designs, but has several problems associated with its implementation. These problems include a need to utilize non-standard fibers having thick (>200 μm) claddings to prevent excessive losses resulting from the presence of a sizable evanescent field at the cladding outer surface; processing and induced mechanical fatigue issues associated with thermal expansion of the fiber cores, and; difficulty in automating the placement and alignment of the optical fibers and any separate collimating elements (e.g., GRIN lenses). These and other problems associated with the Pan approach may significantly raise manufacturing costs and compromise device performance. There remains a need in the art for an array-based nonreciprocal device which is well-suited for high-volume manufacture by automated methods, and which may be produced relatively easily and inexpensively.

SUMMARY

According to a first embodiment of the invention, an integrated isolator array is provided having a plurality of buried waveguides formed in an optically transparent substrate, such as lithium niobate or a glass. Each waveguide is divided into input and output sections. The input sections of the waveguides are preferably adapted with input tapers designed to adiabatically expand the optical mode from a compact size (typically matched to that of standard optical fiber) to a relatively large size. Conversely, the output sections of the waveguides may be adapted with output tapers to adiabatically reduce the optical mode from the large size emerging from the input tapers to a compact size. An intermediate section of the waveguide, extending between the input and output tapers and bisected by the isolator subassembly, provides a path for light propagating in a collimated form from the input to the output section through the isolator subassembly. Fabrication of the waveguides may be accomplished by ion exchange or other suitable techniques that are known in the art. An isolator subassembly, which may consist essentially of layers of Faraday material interposed between layers of birefringent crystal material, is received within a trench formed in the transparent substrate between the input and output sections of the waveguides such that the isolator subassembly intersects the optical paths of the plurality of waveguides.

In another embodiment, a plurality of four-port circulator structures are formed in an optical substrate. Each circulator structure includes a pair of waveguides having first and second sections, each of the first and second sections terminating in a port. A nonreciprocal optical subassembly is fixed within a trench located between the first and second sections and positioned in the optical paths of the waveguide pairs. The nonreciprocal optical subassembly is configured to rotate the polarization of light traveling from the second sections to the first sections of the waveguides while leaving unchanged the polarization of light traveling from the first sections to the second sections. The circulator structure further includes first and second polarization multiplexers respectively coupling the first and second sections of the waveguides. Light entering a port is split by one of the polarization multiplexers into two beams having orthogonal polarizations. The polarized light beams then pass through the nonreciprocal subassembly and are subsequently combined into a single beam by the other polarization multiplexer. The combined beam then exits the circulator structure by an exit port different from its entry port. The polarization multiplexers and nonreciprocal subassembly collectively function to route a first light signal input to a port of the first section of the first waveguide to be output at a port of the second section of the first waveguide, a second light signal input at a port of the second section of the first waveguide to be output at a port of the first section of the second waveguide, and so forth.

The invention further encompasses a doped fiber amplifier array architecture employing an integrated circulator array of the foregoing description. The architecture includes an array of input fibers each carrying an input signal to be amplified, and an array of output fibers each carrying an amplified output signal. Each input fiber is coupled to a corresponding circulator structure via a first port thereof, and each output fiber is coupled to a corresponding circulator structure via a third port thereof. An array of doped fibers are optically coupled at their first ends to corresponding second ports of the circulator structures and receive pump light through their second ends. An input light signal entering a circulator structure is routed to the second port, where it is then coupled into the first end of the corresponding doped fiber. The light signal is amplified as it travels along the length of the doped fiber. A wavelength selective reflector located at the second end of the doped fiber reflects the partially amplified signal, which then travels along the doped fiber in the opposite (backward direction) and is further amplified. The amplified signal is then coupled back into the second port of the circulator. The second ports may be adapted with wavelength selective reflectors, which are highly reflective at the pump light wavelength and non-reflective at the input signal wavelength, to reflect the pump light back into the doped fiber while allowing the amplified light signal to be re-admitted into the circulator structure. The circulator structure routes the amplified light signal to the third port, where it is coupled into the corresponding output fiber. Utilization of the "double-pass" architecture described above, wherein the input light signal and pump light each travel twice (in opposite directions) through a doped fiber offers significant advantages over existing commercial architectures, including compactness, higher gain, lower noise, and lower cost of manufacture.

BRIEF DESCRIPTION OF THE FIGURES

In the accompanying figures:

FIGS. 7(a)–(d) are schematic diagrams depicting the pathways of light entering each of the ports of an individual circulator structure of the FIG. 5 integrated circulator array; and FIG. 8 is a schematic diagram depicting a doped fiber amplifier array architecture incorporating the FIG. 5 circulator array.

DETAILED DESCRIPTION OF SPECIFIC EMBODIMENTS

Figure 1:
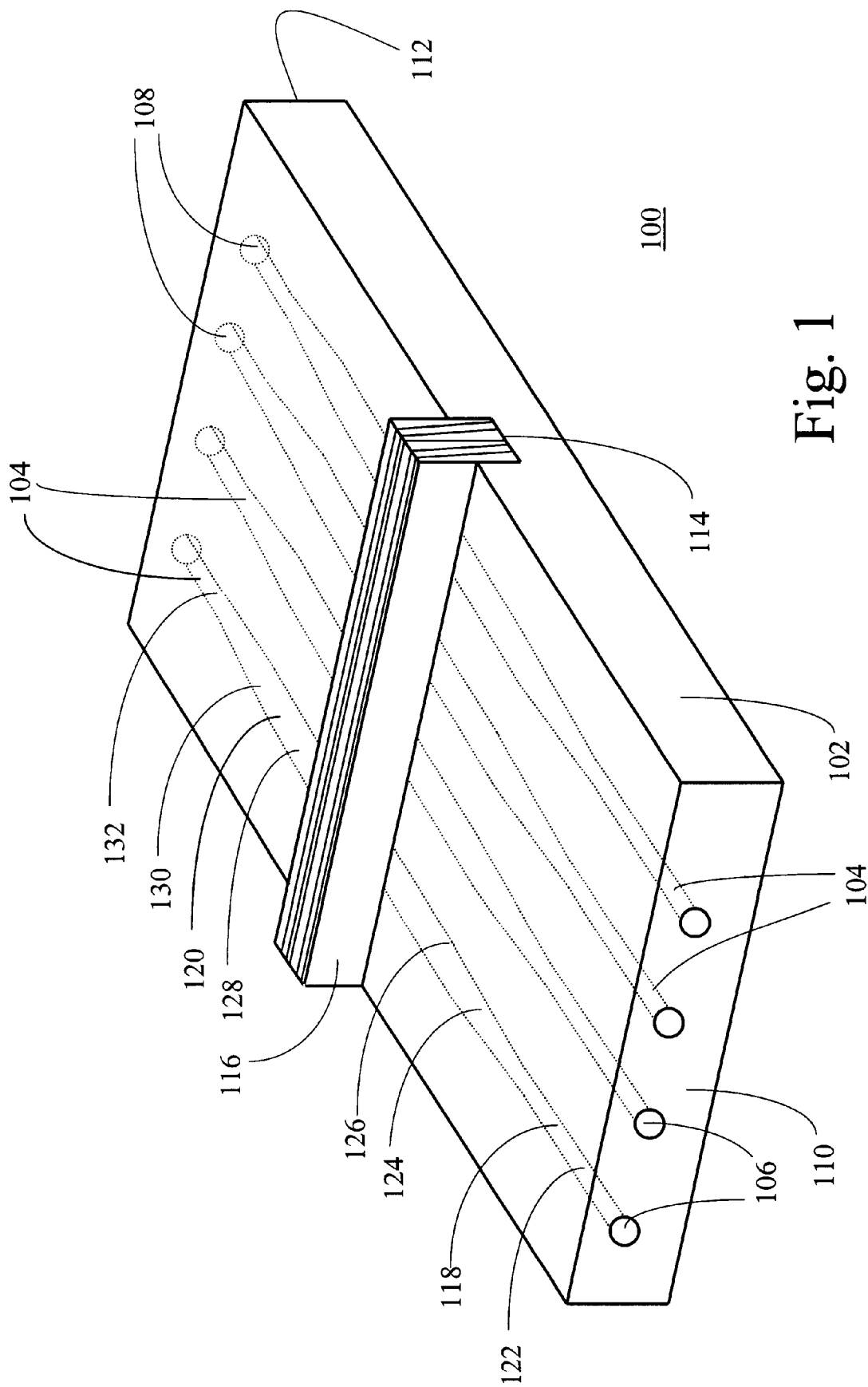
FIG. 1 is a symbolic perspective view of an integrated isolator array, in accordance with an embodiment of the invention.

FIG. 1 illustrates the general structure of an integrated isolator array 100 in accordance with a first embodiment of the invention. Isolator array 100 includes an optical substrate 102 having a plurality of laterally spaced apart waveguides (individually and collectively denoted as 104) formed therein. The waveguides terminate at input and output ports 106 and 108 located at the opposite end faces 110 and 112 of substrate 102. The waveguides may be optically coupled via the input and output ports to corresponding arrays of input and output optical fibers (not shown), which carry input and output light signals. Precise positioning and alignment of the optical fiber arrays relative to the input and output ports may be accomplished by use of v-grooved or similar structures, which are known in the art and will not be discussed herein.

Optical substrate 102 may be fabricated from lithium niobate, a glass, or other material (or combination of materials) which is optically transparent at the wavelength (s) of interest. Waveguides 104 will typically be formed by an ion-exchange or metal indiffusion process which produces local refractive index alteration of substrate 102 in a pattern corresponding to waveguides. Examples of such waveguide formation processes will be discussed below in further detail in connection with FIG. 2. Other implementations of isolator array 100 may utilize a deposition technique to form waveguides 104, whereby a core layer having an elevated refractive index is deposited and patterned on the upper surface of substrate 102, and a cladding layer is subsequently deposited on top of the patterned cores. Waveguides 104 are preferably formed as "buried waveguides" such that the centers of the propagating modes are located a sufficient distance beneath the substrate 102 upper surface to prevent excessive losses caused by interaction of the evanescent fields with the upper surface.

Substrate 102 is adapted with a trench 114 located proximal to the substrate 102 upper surface and oriented transversely with respect to the optical axes of waveguides 104. Trench 114 receives and holds one end of an isolator element 116, which extends upwardly from the trench floor. As will be discussed below, trench 114 should be sufficiently deep to position isolator element 116 within the optical paths of waveguides 104, but should not be so deep as to compromise the mechanical integrity of substrate 102. Trench 114 and isolator element 116 divide each waveguide 104 into two longitudinally opposed sections: an input section 118 and an output section 120. Isolator element 116, the construction of which is discussed below, is a nonreciprocal element which allows propagation of light within each waveguide 104 from input section 118 to output section 120 (and thereafter to output port 108) while blocking or inhibiting propagation of light from output section 120 to input section 118.

Each waveguide input section 118 includes three component sections: a narrow-mode section 122, a taper section 124, and an expanded-mode section 126. Similarly, each output section 120 consists of an expanded-mode section 128, a taper section 130, and a narrow-mode section 132. Taper sections 124 and 130 serve to collimate the forward and backward traveling light, essentially performing the same function effected by GRIN lenses in prior art devices. Forward traveling light entering an input port 106 travels initially through narrow-mode section 122, which preferably has a mode size matched to that of the input fiber in order to minimize insertion losses. The mode is subsequently adiabatically expanded in taper section 124 to form a collimated beam. Expanded-mode section 126 carries the collimated beam to isolator element 116. The collimated beam propagates through isolator element 116 and is captured by expanded-mode section 128. Taper section 130 adiabatically reduces the mode size of forward traveling light, preferably matching the mode size to that of the output fiber. Narrow-mode section 132 carries the reduced-sized mode to a corresponding output port 108, where it may be coupled into an associated output fiber.

Light propagating in the backward or reverse direction enters an output port 108 and travels initially through narrow-mode section 132 of a corresponding output section 120. The mode size of backward traveling light is adiabatically expanded in taper section 130 to form a collimated beam, which propagates through expanded-mode section 128 onto isolator element 116. As will be discussed in greater detail hereinbelow, isolator element 116 splits the backward-travelling beam into two angularly displaced orthogonally polarized beams, neither of which is aligned with expanded-mode section 126. The backward-travelling beam thus diverges from and is not captured by input section 118, effectively blocking the reverse passage of light from output section 120.

Figure 2:
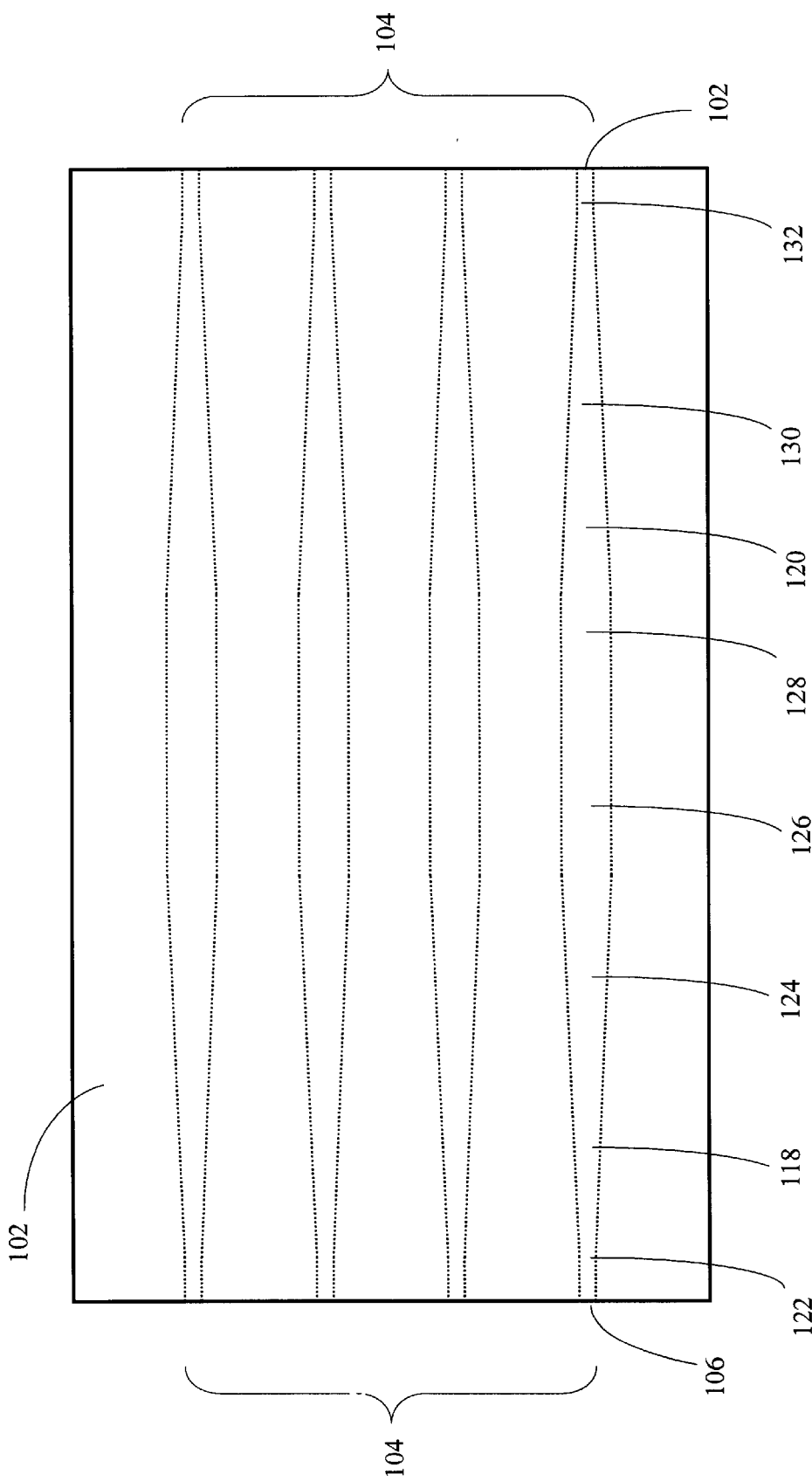
FIG. 2 is a top plan view of the integrated isolator array of FIG. 1 at an intermediate point in its construction, showing in particular detail the arrangement and geometry of waveguides.

The fabrication and arrangement of waveguides 104 may be more easily explained with reference to FIG. 2, which symbolically depicts (in top plan view) isolator array 100 at an intermediate point in its construction prior to formation of trench 114 and attachment of isolator element 116. As discussed hereinabove, waveguides 104 are preferably buried substantially below the upper surface of substrate 102 in order to reduce loss effects associated with interaction of the evanescent field with the upper surface, and also to achieve a circular mode profile (which advantageously minimizes coupling losses caused by mode shape mismatches between the input/output fibers and corresponding waveguides 104). The depth at which waveguides 104 are to be buried will depend on considerations (inter alia) of mode size, process limitations, and optical loss criteria. In a typical implementation of isolator array 100 having a maximum mode field diameter of around 50 $\mu$m, waveguides 104 will preferably be buried to a depth of 30–100 $\mu$m.

Waveguides 104 may be formed in optical substrate 102 by any one of a number of well-known techniques. The appropriate technique will depend on, among other considerations, the choice of material for substrate 102. In one example, waveguides 104 may be formed in a sodium-containing glass by the electric field-assisted silver ion exchange technique. Commercially available glasses that are suited for this technique include Corning® 0211 zinc borosilicate glass and Schott® D263 borosilicate glass. In the electric field-assisted silver ion-exchange technique, waveguides 104 are patterned in silver film on substrate 102 (which may initially comprise a portion of a larger wafer on which multiple isolator array devices are formed) using standard lithographic techniques. Substrate 102 is subsequently mounted in an exchange tank that contacts substrate 102 on the upper surface thereof by an anode melt (e.g, a mixture of $NaNO_3$ and $KNO_3$ held at 280° C.), and on the lower surface by a cathode melt (which may comprise, for example, an identical mixture). Upon application of an electric field, the deposited silver atoms are oxidized to silver ($Ag^+$) ions and enter the substrate 102 in exchange for a sodium ($Na^+$) ion, which migrates from the lower surface of substrate 102 to the cathode. $Ag^+$ ions entering substrate 102 form regions of higher refractive index which, if process parameters are chosen correctly, will form waveguides 104 having desired sets of optical and physical properties, including mode size at a selected wavelength. Once the silver film deposited on the upper surface of substrate 102 is exhausted, the $Ag^+$ ions are buried more deeply into substrate 102 under the influence of the applied electric field and by $Na^+$ ions back-flowing the descending $Ag^+$ ions on the anode (upper) side of substrate 102. The waveguide burial process may be stopped by turning off the applied electric field. If desired, waveguides 104 may be subsequently annealed in the absence of an electric field to achieve targeted mode sizes via thermal diffusion of the $Ag^+$ ions. The physical and optical properties of the resultant waveguides 104 may be optimized for a particular application by selection of an appropriate set of process parameters including temperature, exchange time, anneal time, electric field strength, deposited silver film width and thickness, and duty cycle (degree of waveguide segmentation).

Taper sections 124 and 130 may be constructed in accordance with the field assisted silver ion exchange technique by varying one or both of two process parameters along the light propagation direction: deposited silver film width and duty cycle. With proper choice of these parameters and deposited film thickness, a large range of mode sizes (within the limits of the glass substrate composition) can be achieved. A typical implementation of isolator array 100 has taper sections 124 and 130 formed by varying deposited film width from 3.0 $\mu$m to 40.0 $\mu$m and duty cycle from 100% to 5% along the appropriate direction of light propagation (forward propagation for taper section 124 and backward propagation for taper section 130). It will be recognized that FIG. 2 depicts taper sections 124 and 130 in an exaggerated manner as being relatively short and highly divergent; however, taper sections designed for adiabatic mode transitions will have much smaller angles of divergence and will represent a substantial portion of the overall waveguide length.

It should be noted that the transverse dimensions of waveguides 104 depicted in the figures should be construed as being representative of mode size, rather than of the waveguide physical dimensions. Those skilled in the art will recognize that mode size may be expanded either by increasing or reducing the physical transverse dimension(s) of the waveguide 104 core (thereby reducing the waveguide confinement), or by reducing confinement of the mode by waveguide segmentation. In this manner, expanded-mode sections 126 and 128 may have but do not necessarily have one or more physical transverse dimensions which are greater than the corresponding physical transverse dimensions of narrow-mode sections 122 and 132.

In other implementations of isolator array, waveguides 104 may be formed by the well-known titanium indiffusion method, which is described, for example, in U.S. Pat. No. 4,284,663 to Carruthers, et al. ("Fabrication of Optical Waveguides by Indiffusion of Metals"). Generally, application of the titanium indiffusion process to the construction of isolator array 100 involves depositing a patterned film of titanium on the upper surface of the substrate and subsequently heating the substrate to a high temperature (typically around 1000° C.), causing the titanium to diffuse downwardly into regions of the substrate underlying the patterned film. The diffusion of titanium results in the creation of index-altered regions which define resultant waveguides. The optical and physical properties of the resultant waveguides may be optimized for the particular application by appropriately adjusting the titanium indiffusion process parameters of film width and thickness, segmentation, and temperature-time conditions.

The waveguide formation techniques set forth above and are presented by way of non-limiting examples. Those skilled in the art will recognize that various alternative techniques may be used to form waveguides 104.

Figure 3:
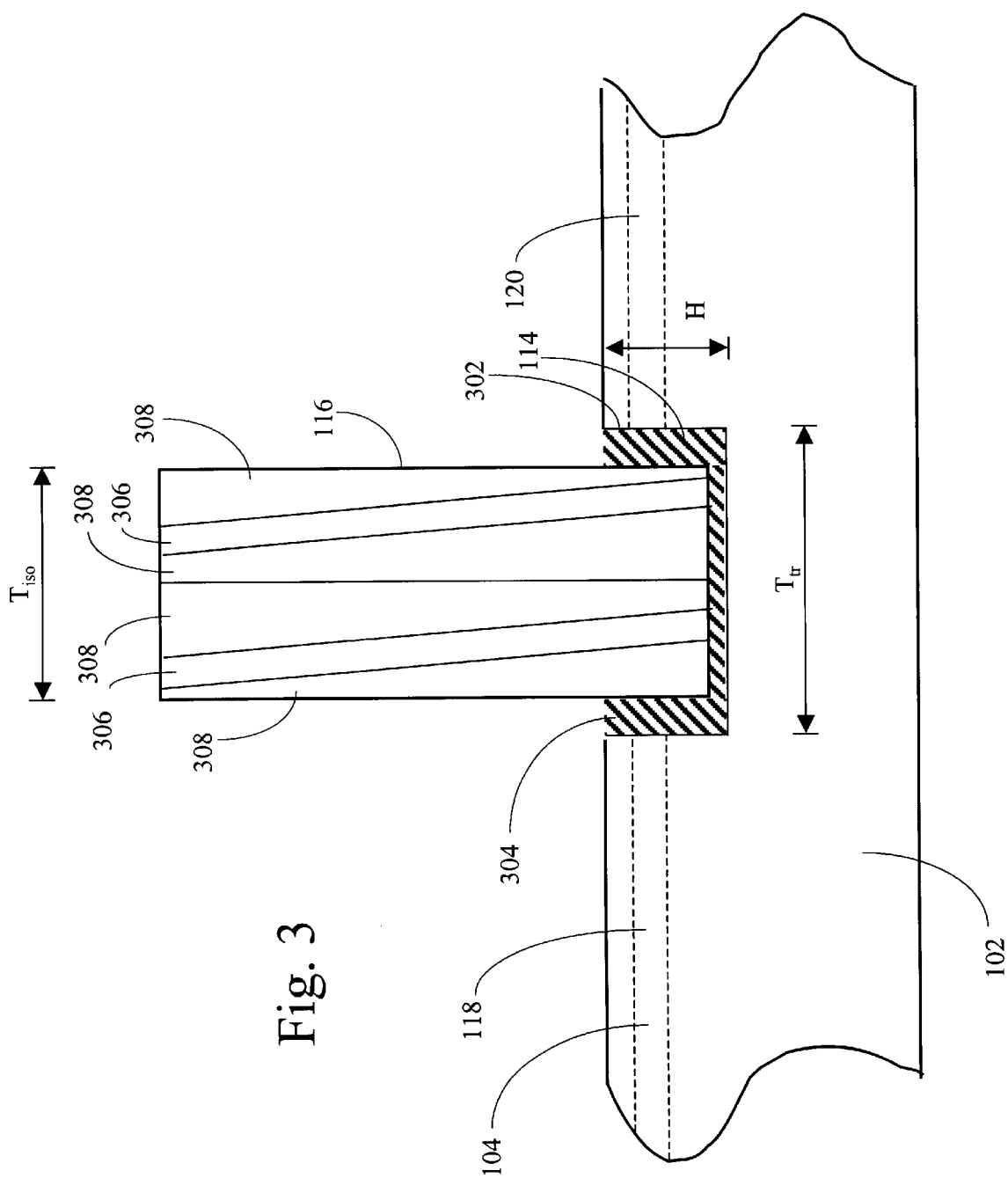
FIG. 3 is a fragmentary elevated side view of the integrated isolator array of FIG. 1, showing in particular detail the relation of the isolator element to the optical substrate.

Following completion of the waveguide formation process, isolator element 116 is positioned in the optical paths of waveguides 104 and affixed to substrate 102. Referring now to FIG. 3, positioning and affixation of isolator element 116 may be accomplished by cutting a trench 114 extending partially through the thickness of substrate 102, which receives and holds a lower end of isolator element 116. The trench 114 has a long axis (perpendicular to the plane of the drawing) oriented transversely and preferably perpendicularly with respect to the optical (longitudinal) axes of waveguides 104, and a thickness $T_{tr}$ that is equal to or slightly greater than a thickness $T_{iso}$ of isolator element 116. The trench height H should be sufficient to enable isolator element 116 to be securely held within the trench (and positioned within the optical pathways of waveguides 104), but should not be so great that the trench extends through or nearly through the full thickness of substrate 102, causing the substrate to separate into two pieces or substantially compromising its structural integrity. Trench 114 will typically extend across the entire transverse width of substrate 102, but may instead extend only partially across substrate 102 provided that the trench has a width at least as great as that of the width of isolator element 116.

Trench 114 may be formed to the desired dimensions by any one of a number of techniques known in the art, such as cutting with a saw blade or laser ablation. In the implementation depicted in FIG. 3, trench 114 has sidewalls 302 which are perpendicular to the substrate upper major surface, causing isolator element 114 to be oriented orthogonally with respect to the substrate 102 plane. In other implementations, sidewalls 302 may be formed at a small predetermined angle relative to a normal (perpendicular) orientation, resulting in a forward or backward tilting of isolator element 116. Such a tilting may be desirable to enhance isolator element 116 optical performance.

In an alternative embodiment of the isolator array, substrate 102 may be bonded to a relatively thick support substrate, and trench 114 may be formed by cutting through the entire thickness of substrate 102 and partially through the thickness of the support substrate. This method reduces the need to precisely control the depth of the cut. In either case, the intrinsic alignment of the input 118 and output sections 120 of waveguides 104 is maintained, thereby avoiding the need for re-alignment following the trench formation step.

In still another embodiment of the isolator array, substrate 102 may be initially formed as two separate and distinct substrate pieces, with the first substrate piece having fabricated therein input sections 118 and the second substrate piece having fabricated therein output sections 120. The two substrate pieces may then be arranged on and affixed to an underlying support substrate, with corresponding waveguide input and output sections placed in mutual alignment. The two pieces are positioned in spaced apart relationship, with the gap between the pieces defining at least in part trench 114. Of course, this embodiment does require precise positioning of the two substrate pieces to ensure acceptable alignment between the input and output sections of the waveguides.

Isolator element 116 may be affixed to substrate 102 by filling trench 114 with an index-matched epoxy, inserting the lower end of isolator element 116 into the trench, and curing the epoxy by an appropriate thermal or UV process. As depicted in FIG. 3, epoxy 304 secures isolator element 116 to substrate 102 and fills any gaps between the endfaces of the waveguide input and output sections and the isolator chip. As long as isolator element 116 is positioned in the optical paths of waveguides 104, its lateral and vertical positioning is non-critical.

In an exemplary embodiment of isolator array 100, isolator element 116 has a multi-layer construction comprising two Faraday rotator layers 306, each interposed between birefringent layers 308. Isolator elements of this general type are known in the optics art and are described, for example, in the aforementioned Sato et al. reference as well as in the aforementioned Pan patent (U.S. Pat. No. 5,706,371), both of which are incorporated by reference. Typical materials for birefringent layers 308 include lithium niobate, lithium tantalate, rutile, calcite, and yttrium orthovanadate. Faraday rotator layers 306 may be formed from materials such as (without limitation) impurity-doped garnet, yttrium iron garnet, pure or mercury-doped cadmium manganese tellerium, or terbium gallium garnet. A permanent magnet (not shown in the figures) is positioned about the isolator element 116 to apply a magnetic field to Faraday rotator layers 306. Faraday rotator layers 306 may alternatively be formed from a material that does not require the influence of an external magnetic field, such as bismuth-substituted rare-earth iron garnets.

In one specific implementation of isolator element 100, lithium niobate is used for the birefringent layers, and a thin film of yttrium iron garnet (YIG) on lithium niobate is used for the Faraday rotator layers. An isolator element of this description may be fabricated on a wafer scale by depositing a YIG thin film on a lithium niobate wafer and then bonding (e.g., with epoxy) a second lithium niobate wafer onto the YIG film in the desired crystallographic orientation. In the isolator element structure disclosed in the Sato et al. reference, the birefringent layers are wedge shaped with interior faces tilted by approximately 12° from the vertical. One method of implementing this structure is by further processing the above-described lithium niobate-YIG-lithium niobate wafer stack according to the following steps: (i) mounting the wafer stack on an adhesive pad; (ii) dicing the wafer stack into a series of elongated slabs by cutting a series of parallel lines across the wafer while avoiding cutting through the adhesive pad; (iii) flipping the diced wafers with slabs held by the adhesive pad upside down onto a vacuum-chuck support structure that has a groove for each slab, orienting it such that each slab is oriented at a 12° angle about its long axis; (iv) applying vacuum to hold the slabs onto the chuck and removing the adhesive pad; (v) polishing the first side of the slabs; (vi) transferring the slabs onto a flat vacuum chuck; (vii) polishing the second side of the slabs; (viii) dicing perpendicularly to the slab long axes to produce individual chips.

As discussed above, isolator element 116 allows the forward propagation of light from input sections 118 to output sections 120 of waveguides 104, and inhibits the backward propagation of light from output sections 120 to input sections 104. Details concerning the optical pathways of forward and backward traveling light in an exemplary isolator element of the type described above are set forth, for example, in the aforementioned Sato and Pan references, and hence need not be repeated herein. Generally speaking, the isolation function arises from the nonreciprocal nature of Faraday rotator layers 306, which rotate the polarizations of backward-propagating beams while leaving the polarizations of forward-propagating beams unchanged. Forward traveling light exits isolator element 116 as a single collimated beam having an optical axis substantially aligned with that of a corresponding expanded-mode section and is thus coupled into output section 120. Backward traveling light exits isolator element 116 as two vertically opposed orthogonally polarized beams each having optical axes which are angularly spaced from the optical axis of expanded-mode section 126 by a tilt angle φ, i.e., the beams are vertically tilted with respect to waveguide optical axis. This tilting effect prevents the backward traveling beams from being coupled into the corresponding input section 118. By selecting the appropriate geometry and materials of isolator element 116, a high degree of isolation (>50 dB) of the backward traveling light may be achieved while limiting insertion losses in the forward traveling light to less than 0.5 dB.

It should be noted that certain implementations of isolator element 116 may produce a lateral and/or angular displacement of forward-traveling light such that the beam leaving isolator element 116 is not aligned with the corresponding beam entering isolator element 116. In such situations, the waveguide output section should be laterally and/or angularly offset by the appropriate distance or angle in order to insure that the forwardly traveling beam is fully captured by the waveguide output section.

It is further noted that the waveguides need not be formed as continuous structures, wherein the input and output sections of the waveguides are initially joined (prior to attachment of isolator element 116). In some implementations of isolator array 100, it may be beneficial to form each waveguide in two or more sections, such that the input and output sections are separated by gaps. These gaps may be located and sized to correspond to the placement of isolator element 116.

Figure 4:
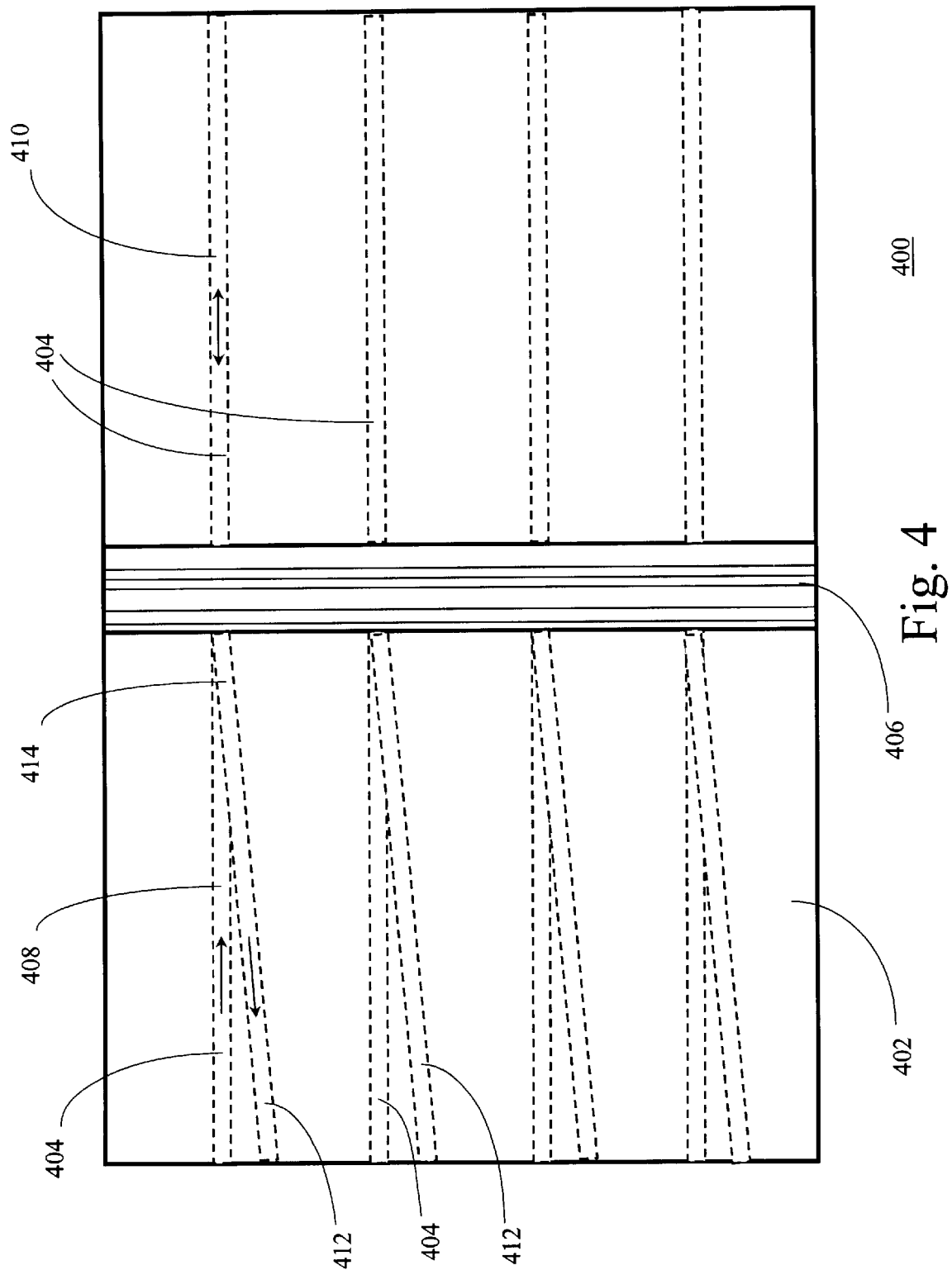
FIG. 4 is a top plan view of an integrated circulator array in accordance with another embodiment of the invention, wherein each isolator structure of the FIG. 1 array is adapted with an additional waveguide to capture backward-propagating light.

In another embodiment of the invention, an isolator array constructed substantially as described above may be adapted with additional waveguides positioned to receive backward-traveling light, thereby producing a three-port circulator array. FIG. 4 shows a symbolic top plan view of a three-port circulator array 400 consisting essentially of an optical substrate 402 having a set of first waveguides 404 formed therein. First waveguides 404 are divided by isolator element 406 (which may be substantially identical in its construction and function to isolator element 116 of the FIG. 1 embodiment) into input sections 408 and output sections 410. First waveguides 404 are preferably adapted with taper sections (not shown) as described above to adiabatically expand the mode sizes of forward- and backward-propagating beams, and may be formed by the field-assisted silver ion exchange technique described above or by any other suitable method. Isolator element 406 is positioned in the optical paths of first waveguides 404 and may be affixed to substrate 402 using the trench-based technique of the isolator array embodiment.

Circulator array 400 is further adapted with a set of second waveguides 412. Each second waveguide 412 is uniquely associated with a first waveguide in laterally and/or angularly offset relation and has a first end 414 positioned to capture at least a portion of the backward-traveling beam leaving isolator element 406. Second waveguides 412 are preferably similar in their construction to the input sections of first waveguides 402, having an expanded-mode section positioned proximally to isolator element 406, a taper section for adiabatically reducing the mode size of the backward-traveling light signals, and a narrow-mode section terminating at the substrate endface in a port and having a mode size matched to that of a corresponding optical fiber coupled to the second waveguide via the port. Second waveguides 412 may be formed simultaneously with first waveguides 404 using the field-assisted ion exchange or other appropriate technique.

In operation, forward-traveling light signals propagating in first waveguides 404 are directed to the output sections of the first waveguides and thereafter to first output ports, as described above in connection with the isolator array embodiment. Backward-traveling light signals, which are introduced into first waveguides 404 via the output ports, are angularly and/or laterally displaced by isolator element 406 and are at least partially captured by second waveguides and are subsequently directed to second output ports. In this manner, a circulator function is achieved wherein light signals introduced at a first port (the input port of the first waveguide) are directed to a second port (the output port of the first waveguide) and light signals introduced at the second port are directed to a third port (the output port of the second waveguide).

Figure 5:
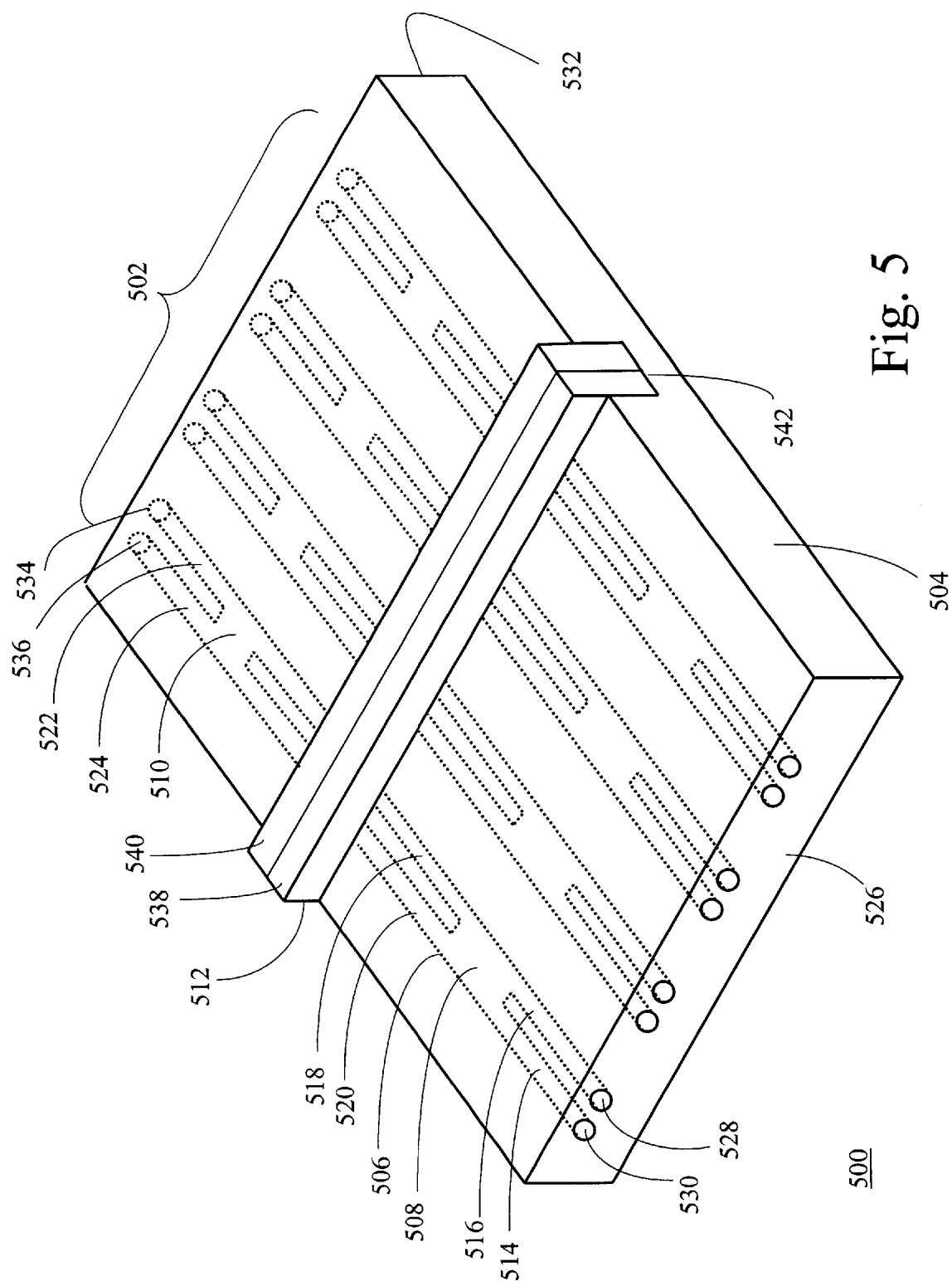
FIG. 5 is a symbolic perspective view of an integrated four-port circulator array in accordance with a still further embodiment of the invention.

FIG. 5 depicts a circulator array 500 in accordance with another embodiment of the invention. Circulator array 500 generally comprises a plurality of waveguide-based four-port circulators (individually and collectively denoted as 502) formed in an optical substrate 504, with each circulator 502 individually including a waveguide pair 506 coupled by first and second polarization multiplexers 508 and 510, and a nonreciprocal polarization rotation element (NPRE) 512 disposed in the optical pathways of the waveguide pairs and affixed to substrate 504. Optical substrate 504 will preferably comprise a non-birefringent material, such as a glass, to avoid introducing polarization mode dispersion (PMD) into the light signals propagating therethrough. However, if use of a birefringent material such as lithium niobate is desired, then PMD may be compensated by the inclusion of additional polarization elements, either formed within the substrate or located exteriorly thereto. Each waveguide pair 506 comprises laterally adjacent first and second waveguides 514 and 516 extending longitudinally across substrate 504, with NPRE 512 dividing the first and second waveguides into first sections 518 and 520 (shown on the left (near) side of substrate 504 in FIG. 5) and second sections 522 and 524 (shown on the right (far) side). It should be understood that the terms "left" and "right" are used only for ease of explanation and are not intended to limit the invention to a particular spatial orientation. First sections 518 and 520 of first and second waveguides 514 and 516 respectively terminate at endface 526 in first and third ports 528 and 530. Second sections 522 and 524 of first and second waveguides 514 and 516 respectively terminate at opposite endface 532 in second and fourth ports 534 and 536. Each port will typically be coupled to a corresponding optical fiber (not shown), which conveys optical signals to and/or from circulator array 500. Positioning and alignment of the optical fibers with respect to associated waveguide ports may be accomplished using a v-grooved support affixed to optical substrate 502.

NPRE 512 consists essentially of a bulk optical element configured to rotate the polarization of leftward traveling light (light propagating from the right to the left of substrate 504) while leaving unchanged the polarization of rightward traveling light (light propagating from the left to the right of the substrate). In one implementation, NPRE 512 is constructed from a Faraday rotator layer 538 bonded at a desired orientation to an optically active plate 540, which may comprise a half-wave plate. A permanent magnet (not shown), arranged about NPRE 512, applies a magnetic field to Faraday rotator layer 538. The polarization of light propagating in the rightward direction in circulators 502 is rotated 45° counterclockwise by Faraday rotator layer 538 and 45° clockwise by optically-active plate 540 for an aggregate 0° polarization rotation. In contradistinction, the polarization of leftwardly propagating light is rotated 45° counterclockwise by optically active plate 540 and an additional 45° counterclockwise by Faraday rotator layer 538 for an aggregate 90° counterclockwise rotation.

NPRE 512 may be affixed to substrate 504 using substantially similar techniques to those set forth above in connection with the isolator array embodiment. In brief, a trench 542 is formed in substrate 504 having a width slightly greater than the thickness of NPRE 512 and a depth sufficient to position NPRE in the optical paths of waveguide pairs 506. Trench 542 preferably has a long axis perpendicular to the optical axes of the waveguide pairs. Trench 542 will preferably extend only partially through the thickness of substrate 504 in order to preserve the intrinsic alignment of the first and second sections of waveguide pairs 506; alternatively, trench 542 may extend fully through the thickness of substrate 504 and partially through a support substrate, in the manner described above. NPRE 512 may be bonded to substrate 504 by filling trench 542 with an index-matched epoxy, inserting the lower end of NPRE 512 into the trench, and curing the epoxy by an appropriate thermal or UV process. Again, provided that NPRE 512 is positioned in the optical paths of waveguide pairs 506, its lateral and vertical positioning relative to substrate 504 is noncritical.

Figure 6:
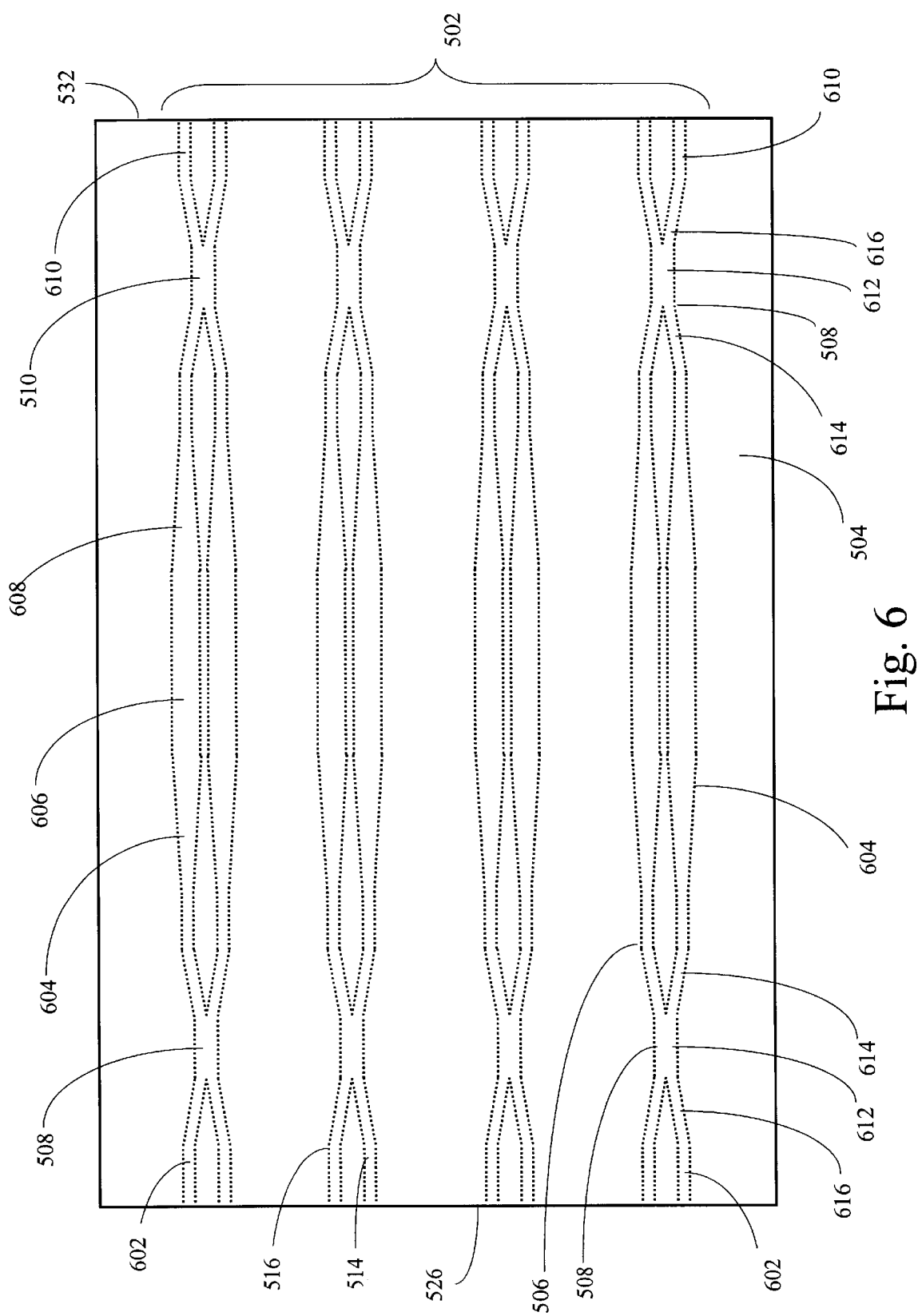
FIG. 6 is a top plan view of the integrated circulator array of FIG. 5, showing in particular detail the arrangement and geometry of the waveguide pairs and polarization multiplexers.

Features of circulators 502 may be more readily understood with reference to FIG. 6, which symbolically depicts (in top plan view) circulator array 500 at an intermediate point in its construction prior to attachment of NPRE 512. Beginning at endface 526 and proceeding rightwardly, each waveguide of waveguide pair 506 includes a first narrow-mode section 602, a first taper section 604, an expanded-mode section 606, a second taper section 608, and a second narrow-mode section 610. The first narrow-mode sections 602 of each waveguide pair 506 are coupled together by first polarization multiplexer 508, the structure and function of which will be discussed below. Similarly, the second narrow-mode sections 610 of each waveguide pair 506 are coupled together by second polarization multiplexer 510. First and second narrow-mode sections 602 and 610 of first and second waveguides 514 and 516 will preferably have mode sizes matched to those of the optical fibers carrying light signals to and/or from the circulators in order to minimize insertion losses. First and second taper sections 604 and 608 are configured to receive the light signals leaving (respectively) first and second polarization multiplexers 508 and 510 and to adiabatically expand the mode size from a first compact size matched to the optical fiber mode to a second, relatively larger size. The light signals, having expanded mode sizes, are then conveyed to and from NPRE via expanded-mode section 606. All of the waveguide features are preferably buried below the upper major surface of substrate 504 at a sufficient depth to prevent excessive losses arising from interaction of the evanescent fields with the substrate surface, as described above. The depth(s) at which the several waveguide structures are to be buried will depend on considerations (inter alia) of mode size, process limitations, and optical loss criteria. In a typical implementation of circulator array 500 having a maximum mode field diameter of around 50 $\mu$m, waveguide pairs 506 will preferably be buried to a depth of 30–100 $\mu$m.

As discussed above in connection with isolator array 100, the transverse dimensions depicted in FIG. 6 are representative of mode size rather than waveguide physical dimensions, and expansion of mode size may be effected by either increasing or decreasing the waveguide transverse dimension (otherwise referred to as critical dimension, or CD) by an appropriate amount, or by segmentation of the waveguide.

First and second polarization multiplexers 508 and 510 either combine or split entering light signals, depending on the direction of propagation. Each polarization multiplexer includes a central section 612 coupled at opposite ends thereof to inner and outer branching sections 614 and 616. Inner branching sections 614 of first and second polarization multiplexers 508 and 510 are coupled to opposite ends of expanded-mode section 606 of waveguide pair 506. Outer branching sections 616 of first and second polarization multiplexers 508 and 510 are respectively coupled to first narrow-mode section 602 and second narrow-mode section 610 of waveguide pair 506. As is discussed in further detail below, an inwardly traveling light signal (a light signal traveling from one of the ports toward NPRE 512) propagating through one waveguide of waveguide pair 506 is split into two orthogonally polarized beams upon encountering a polarization multiplexer, with one polarized beam directed into first waveguide 514 and the other beam directed into second waveguide 516. The orthogonally polarized beams are then passed through NPRE 512 (which, depending on the direction of propagation, rotates or leaves unrotated the polarizations of the polarized beams) and are subsequently recombined at the other polarization multiplexer, with the recombined beam being directed into one waveguide of the waveguide pair. The splitting/combining performance of the polarization multiplexers may be optimized by appropriately adjusting the transverse and longitudinal dimensions of central sections 612 and/or the branching angles described by inner and outer branching sections 614 and 616. Waveguide-based polarization multiplexers of this general type and function are well known in the integrated optics art, and are disclosed, for example, in U.S. Pat. Nos. 5,946,434 ("Integrated Optic Polarization Device and Method") and 5,696,856 ("Integrated Optical Polarisation Splitter").

Waveguide pairs 506 and polarization multiplexers 508 and 510 may be formed by the field-assisted silver ion-exchange technique discussed above in connection with isolator array 100. The operational and physical properties of the various features of the waveguide pairs and polarization multiplexers may be optimized through selection of appropriate process parameters, including exchange temperature and time, anneal temperature and time, electric field strength, silver film width and thickness, and waveguide segmentation. The waveguide pairs and polarization multiplexers may alternatively be constructed using another suitable technique (or combination of techniques) known in the integrated optics art, such as titanium indiffusion.

FIGS. 7(*a*–*d*) depicts the pathways of light signals introduced into, respectively, the first, second, third, and fourth ports of an exemplary circulator 502. Referring initially to FIG. 7(*a*), a light signal coupled via first port 528 into first section 518 of first waveguide 514 is split by first polarization multiplexer 508 into two beams having orthogonal polarizations. A first of the polarized beams (e.g., the TM beam) is directed into first waveguide 514, and a second polarized beam (e.g., the TE beam) is directed into second waveguide 516. The TE and TM beams are respectively represented in the figures as dotted and dashed lines. The TE and TM beams pass through NPRE 512 with their initial polarizations unchanged (as described above) and are captured by respective second sections 522 and 524 of first and second waveguides 514 and 516. The two orthogonally polarized beams are combined into a single unpolarized beam at second polarization multiplexer 510, which is directed into first waveguide 514. The unpolarized beam subsequently exits circulator 502 via second port 534.

FIG. 7(b) depicts the pathway of a light signal introduced into second port 534 of circulator 502. The light signal travels through second section 522 of first waveguide 514 and is split by second polarization multiplexer 510 into two orthogonally-polarized beams. The second (e.g., TE) beam is passed via second waveguide 516 into NPRE 512, where it undergoes a 90° counterclockwise polarization rotation. Similarly, the first (e.g., TM) beam, which travels through first waveguide 514, has its polarization rotated by 90° in the counterclockwise direction by NPRE 512. The first beam, now TE-polarized, is captured by first section 518 of first waveguide 514 while the second beam, now TM-polarized, is captured by first section 520 of second waveguide 516. The two beams are combined at first polarization multiplexer 508, and the combined beam is routed to third port 530 via second waveguide 516.

Figure 7C:
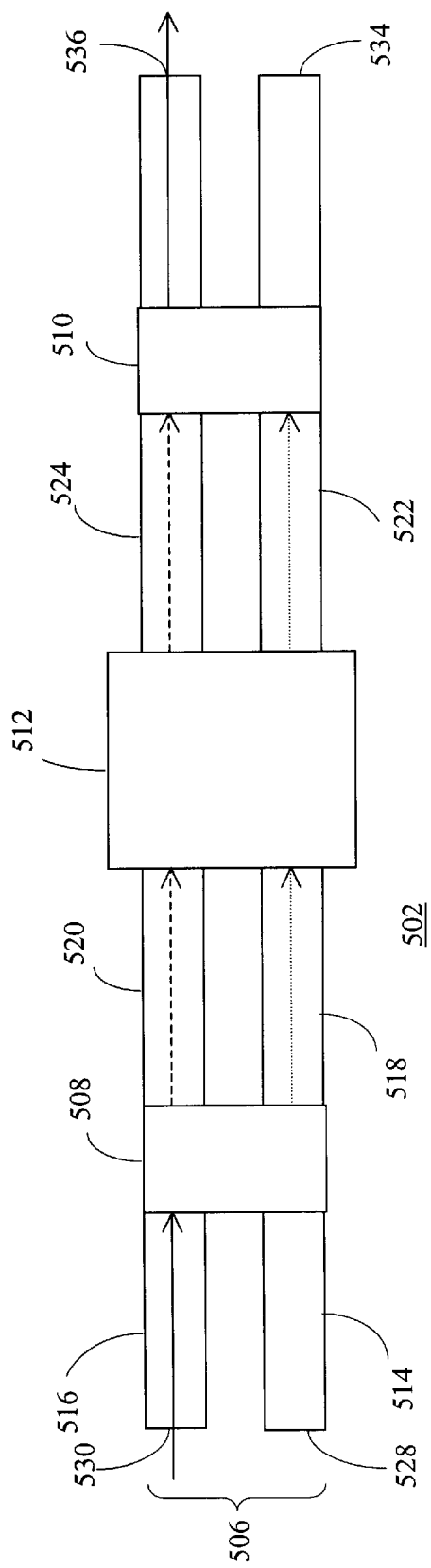

Referring now to FIG. 7(c), a light signal coupled via third port 530 into first section 520 of second waveguide 516 is split by first polarization multiplexer 508 into two beams having orthogonal polarizations. A first of the polarized beams (e.g., the TE beam) is directed into second waveguide 516, and a second polarized beam (e.g., the TM beam) is directed into firs t waveguide 514. The TE and TM beams pass through NPRE 512 with their initial polarizations unchanged (as described above) and are captured by respective second sections 522 and 524 of first and second waveguides 514 and 516. The two orthogonally polarized beams are combined into a single unpolarized beam at second polarization multiplexer 510, which is subsequently directed into second waveguide 516. The unpolarized beam subsequently exits circulator 502 via fourth port 536.

Figure 7D:
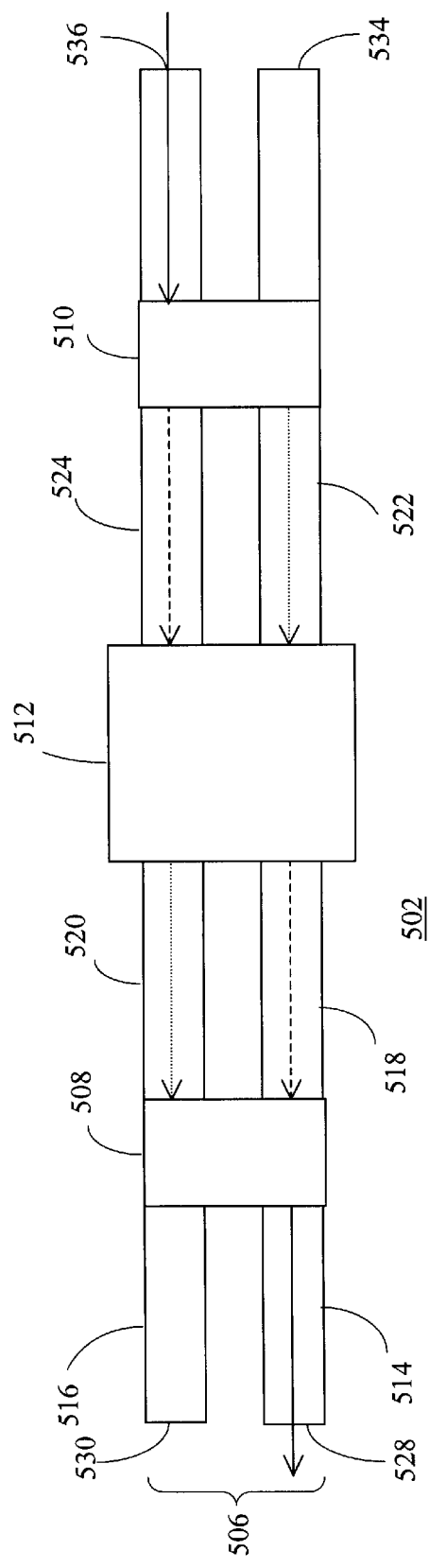

Finally, FIG. 7(d) depicts the pathway of a light signal introduced into fourth port 536 of circulator 502. The light signal travels through second section 524 of second waveguide 516 and is split by second polarization multiplexer 510 into two orthogonally-polarized beams. The first (e.g., TM) beam is passed via second waveguide 516 into NPRE 512, where it undergoes a 90° counterclockwise polarization rotation. Similarly, the second (e.g., TE) beam, which travels through first waveguide 514, has its polarization rotated by 90° in the counterclockwise direction by NPRE 512. The first beam, now TE-polarized, is captured by first section 520 of second waveguide 516 while the second beam, now TM-polarized, is captured by first section 518 of first waveguide 514. The two beams are then combined at first polarization multiplexer 508, and the combined beam is routed to first port 528 via first waveguide 514.

In sum, circulator 502 functions as a conventional four-port circulator, wherein a first light signal introduced at a first port is routed to a second port, a second light signal introduced at the second port is routed to a third port, a third light signal introduced at the third port is routed to a fourth port, and a fourth light signal introduced at the fourth port is routed to the first port.

A circulator array of the type depicted in FIG. 5 and discussed above may be beneficially utilized for a number of applications. One such application is a compact double-pass doped fiber amplifier array, which is schematically depicted in FIG. 8. Amplifier array 800 generally comprises sets of input fibers 802 and output fibers 804 for carrying optical signals to and from the amplifier array, a circulator array 500 (as described above) for routing the optical signals to and from a set of doped optical fibers 806 in which the signals are amplified, and a pump light source 808 for providing-pump light to doped optical fibers 806. Input fibers 802 are individually optically coupled to respective first ports 528 of circulators 502. Output fibers 904 are individually coupled to respective third ports 530 of circulators 502. Precise positioning and alignment of input and output fibers 802 and 804 with respect to corresponding first and third ports 528 and 530 may be achieved by use of a v-grooved support 810. Again, it should be noted that while FIG. 8 depicts a four-port amplifier array, other implementations of the invention may include a lesser or greater number of ports.

Circulators 502 route the input signals coupled into waveguide pairs 506 via first ports 528 to respective second ports 534. The operation and optical pathways, of circulators 502 are discussed above in connection with FIGS. 7(a–d). Second ports 534 are each optically coupled to a corresponding doped fiber 806. A v-grooved support 812 may be utilized for alignment and positioning of doped fibers 806.

Each doped fiber 806 is optically coupled at one end 814 to a second port 534 of circulator 502, and at the other end 816 to pump light source 808. Doped fibers 806 will typically comprise a length of looped optical fiber doped with erbium or other rare earth element. Doped fibers of this general description are available from various commercial suppliers, such as Corning Corporation of Corning, N.Y. The use of optically pumped erbium-doped fibers to produce amplification of optical signals is well known in the art, and thus will not be discussed herein. Pump light source 808 is operable to emit light of a wavelength suitable for optical pumping of the dopant atoms (e.g., 980 nanometers for erbium-doped fibers), and may include, for example, a laser emitter array, each emitter supplying pump light to a separate doped fiber 806. In other implementations of amplifier array 800, pump light source 808 may comprise a single emitter (or small number of emitters) which supplies pump light to multiple doped fibers via one or more splitter circuits. In still other implementations, pump light source may consist of multiple separate sources, with each source pumping a corresponding doped fiber. It should be noted that the foregoing examples of pump light source 808 are intended as illustrative rather than limiting, and that amplifier array 800 should not be construed as requiring any particular configuration of pump light source 808. A v-grooved support 818 may be provided to position and align ends 816 of doped fibers 806 with corresponding ports of pump light source 808.

The double-pass architecture of amplifier array 800 is enabled by the use of wavelength-selective reflectors disposed at or proximal to ends 814 and 816 of doped fibers 806. Reflectors 820 disposed at ends 814 (the ends adjacent to circulator array 500) are configured to be highly reflective at the wavelength(s) of the pump light (typically around 980 nanometers for erbium-doped fiber) and highly transmissive at the wavelength(s) of the input light signals (typically around 1550 nanometers for telecommunications applications). Conversely, reflectors 822 disposed at ends 816 (the ends adjacent pump light source 808) are configured to be highly transmissive at the pump light wavelength and highly reflective at the input light signal wavelength(s). Reflectors 820 and 822 may take the form of dielectric thin film coatings applied to the endfaces of doped fibers 806 and/or the endfaces of circulator array 500 and pump light source 808 adjacent to the doped fibers. Those skilled in the art will recognize that reflectors 820 and 822 may be implemented in different forms. An input light signal coupled into end 814 of doped fiber 806 via second port 534 initially travels the length of doped fiber 806 in the forward direction. The input light signal is amplified via interactions with excited dopant atoms as it passes through the doped fiber. After the input light signal has traversed the full length of doped fiber 806, it is reflected by wavelength-specific reflector 822 and subsequently traverses doped fiber 806 in the reverse direction, undergoing further amplification. The amplified input light signal, having fully traversed doped fiber 806 in the reverse direction, is then coupled back into second port 534 of circulator 502 via reflector 820, which is transmissive at the input signal light wavelength(s).

Pump light generated by pump light source 808 similarly traverses the doped fiber twice, first in the backward direction (counter to the initial propagation direction of the input light signal), and then in the forward direction. Pump light is introduced into ends 818 of doped fibers 806 via reflectors 822, which are transmissive at the pump light wavelength(s). The pump light propagates along the length of the associated doped fiber (causing excitation of the dopant atoms) and is reflected by wavelength specific reflector 820 at end 814. After traversing the doped fiber in the forward direction, the pump light is coupled out of the doped fiber via reflector 822 at end 816.

The amplified input light signals (hereinafter referred to as the "output light signals") introduced at second ports 534 are routed by circulators 502 to third ports 530, in the manner discussed above in connection with FIG. 7(b). The output signals are then coupled into corresponding respective output fibers 804. A detector array (not shown) may be provided to measure the power levels of the input and output light signals and monitor amplifier gain in each signal channel (which information may be used in a control feedback loop). The detector array may take the form of an indium-gallium arsenide (InGaAs) detector array affixed to the upper surface of circulator array 500 proximal to the first and third ports 528 and 530 of circulators 502. Second order relief gratings (i.e., taps) may be formed in waveguide pairs 506 to direct a small portion of the input and output light signals into the detector.

It will be appreciated that the double-pass architecture described above, wherein both the pump light and the input signal traverse the doped fiber twice, presents significant cost and size advantages relative to conventional single-pass architectures by effectively reducing the amount of doped fiber required to obtain a desired amount of signal amplification.

It is further noted that the circulator-array based double-pass architecture discussed above may also be implemented in connection with a doped waveguide amplifier array, wherein an array of waveguides doped with erbium or other rare earth element are substituted for and perform the function of the doped fibers 806 of the FIG. 8 embodiment. In a doped waveguide amplifier array of this type, the doped waveguides may be formed in a common substrate with the circulator array; alternatively, the waveguide array may be formed on a separate substrate, with corresponding ports of the circulator array and doped waveguide array placed in optical communication by butt coupling of the respective edge surfaces of the substrates.

Those skilled in the art will recognize that an optical chip having expanded functionality may be produced by integrating the isolator or circulator arrays described and depicted herein with other structures formed on a common substrate. For example, arrays of add/drop multiplexer or dispersion compensators may be produced by combining the circulator array described above with fixed or tunable gratings formed in the substrate.

It will be recognized by those skilled in the art that, while the invention has been described above in terms of preferred embodiments, it is not limited thereto. Various features and aspects of the above-described invention may be used individually or jointly. Further, although the invention has been described in the context of its implementation in a particular environment and for particular applications, e.g., optical communications, those skilled in the art will recognize that its usefulness is not limited thereto and that the present invention can be beneficially utilized in any number of environments and implementations. Accordingly, the claims set forth below should be construed in view of the full breadth and spirit of the invention as disclosed herein.

What is claimed is:

1. An integrated circulator device, comprising:
   an optical substrate;
   a waveguide pair including first and second laterally adjacent waveguides formed in said optical substrate, each of said first and second waveguides having a first section and a second section;
   first and second polarization multiplexers formed in said substrate, said first polarization multiplexer coupling said first sections of said waveguide pair and said second polarization multiplexer coupling said second sections of said waveguide pair, each of said polarization multiplexers being configured to split or combine entering light signals depending on the direction of propagation of said light signals; and
   a nonreciprocal polarization rotation element positioned in the optical paths of said first and second waveguides between said first and second sections of said waveguide pair, said nonreciprocal polarization rotation element being configured to rotate a polarization of optical signals passing from said second section to said first section while leaving substantially unchanged a polarization of optical signals passing from said first section to said second section.

2. The device of claim 1, further comprising a trench formed in said optical substrate, said trench being oriented transversely with respect to the longitudinal axes of said first and second waveguides, and wherein said trench receives and holds a lower end of said nonreciprocal polarization rotation element.

3. The device of claim 2, wherein said trench has a longitudinal axis oriented perpendicularly with respect to the longitudinal axes of said first and second waveguides.

4. The device of claim 2, wherein said trench extends partially through a thickness of said optical substrate.

5. The device of claim 1, wherein said first sections of said first and second waveguides each include a first taper section for expanding inwardly traveling light from a first mode size to a second relatively larger mode size.

6. The device of claim 5, wherein said second sections of said first and second waveguides each include a second taper section for expanding inwardly traveling light from a first mode size to a second relatively larger mode size.

7. The device of claim 1, wherein said optical substrate is a glass.

8. The device of claim 7, wherein said waveguide pair is fabricated in said optical substrate by field-assisted silver ion exchange.

9. The device of claim 1, wherein said optical substrate comprises separate first and second pieces, said first section of said waveguide pair being formed in said first piece and said second section of said waveguide pair being formed in said second piece, said first and second pieces being spaced apart across a gap, and said isolator element being disposed at least partially within said gap.

10. The device of claim 9, wherein said first and second pieces are affixed to a common support substrate.

11. The device of claim 1, wherein said optical substrate is affixed to an underlying support substrate, and said trench extends fully through a thickness of said optical substrate and partially into a thickness of said support substrate.

12. The device of claim 1, wherein said first and second sections of said waveguide pair are formed simultaneously in said optical substrate.

13. The device of claim 1, wherein said nonreciprocal polarization rotation element comprises a Faraday rotator layer bonded at a desired orientation to an optically active plate.

14. The device of claim 1, wherein said first and second polarization multiplexer each comprise a central section coupled at opposite ends thereof to inner and outer branching sections.

15. An integrated optical circulator array, comprising:

a planar optical substrate;

a plurality of waveguide pairs formed in said optical substrate, each waveguide pair including first and second laterally adjacent waveguides formed in said optical substrate, each of said first and second waveguides having a first section and a second section;

a plurality of sets of first and second polarization multiplexers formed in said substrate, each set of first and second multiplexers being uniquely associated with a respective waveguide pair, each one of said first polarization multiplexers coupling said first sections of the respective waveguide pair and each one of said second polarization multiplexers coupling said second sections of the respective waveguide pair, said first and second polarization multiplexers being configured to split or combine entering light signals depending on the direction of propagation of said light signals; and a nonreciprocal polarization rotation element positioned in the optical paths of at least two of said plurality of waveguide pairs between said first and second sections of said first and second waveguides of said waveguide pairs, said nonreciprocal polarization rotation element being configured to rotate a polarization of optical signals passing from said second sections to said first sections while leaving substantially unchanged a polarization of optical signals passing from said first sections to said second sections.

16. The circulator array of claim 15, further comprising a trench formed in said optical substrate, said trench being oriented transversely with respect to the longitudinal axes of said plurality of waveguide pairs, and wherein said trench receives and holds a lower end of said nonreciprocal polarization rotation element.

17. The circulator array of claim 16, wherein said trench has a longitudinal axis oriented perpendicularly with respect to the longitudinal axes of at least two of said plurality of waveguide pairs.

18. The circulator array of claim 16, wherein said trench extends partially through a thickness of said optical substrate.

19. The circulator array of claim 16, wherein said optical substrate is affixed to an underlying support substrate, and said trench extends fully through a thickness of said optical substrate and partially into a thickness of said support substrate.

20. The circulator array of claim 15, wherein said first sections of said first and second waveguides each include a first taper section for expanding inwardly traveling light from a first mode size to a second relatively larger mode size.

21. The circulator array of claim 20, wherein said second sections of said first and second waveguides each include a second taper section for expanding inwardly traveling light from a first mode size to a second relatively larger mode size.

22. The circulator array of claim 15, wherein said nonreciprocal polarization rotation element comprises a Faraday rotator layer bonded at a desired orientation to an optically active plate.

23. The circulator array of claim 15, wherein said first and second polarization multiplexers each comprise a central section coupled at opposite ends thereof to inner and outer branching sections.

* * * * *